(12) United States Patent
Goldhamer

(10) Patent No.: US 9,253,780 B2
(45) Date of Patent: Feb. 2, 2016

(54) COLLABORATIVE MEASUREMENTS IN UN-SYNCHRONIZED WIRELESS NETWORKS

(71) Applicant: Mariana Goldhamer, Ramat Gan (IL)

(72) Inventor: Mariana Goldhamer, Ramat Gan (IL)

( * ) Notice: Subject to any disclaimer, the term of this patent is extended or adjusted under 35 U.S.C. 154(b) by 0 days.

(21) Appl. No.: 14/677,990

(22) Filed: Apr. 3, 2015

(65) Prior Publication Data

US 2015/0215940 A1 Jul. 30, 2015

Related U.S. Application Data

(63) Continuation of application No. 13/785,195, filed on Mar. 5, 2013, now Pat. No. 9,055,478.

(30) Foreign Application Priority Data

Mar. 7, 2012 (IL) .......................................... 218527

(51) Int. Cl.
| | |
|---|---|
| *H04W 72/04* | (2009.01) |
| *H04W 24/10* | (2009.01) |
| *H04W 24/08* | (2009.01) |
| *H04W 52/24* | (2009.01) |
| *H04W 72/08* | (2009.01) |

(52) U.S. Cl.
CPC .......... *H04W 72/0453* (2013.01); *H04W 24/08* (2013.01); *H04W 24/10* (2013.01); *H04W 52/243* (2013.01); *H04W 72/085* (2013.01)

(58) Field of Classification Search
USPC ......................................... 370/252, 310–350
See application file for complete search history.

(56) References Cited

U.S. PATENT DOCUMENTS

| | | | |
|---|---|---|---|
| 6,130,886 A | 10/2000 | Ketseoglou | |
| 8,730,853 B2 | 5/2014 | Lee | |
| 2003/0142640 A1* | 7/2003 | Pajukoski et al. | ............. 370/321 |
| 2010/0267408 A1 | 10/2010 | Lee et al. | |
| 2010/0309801 A1* | 12/2010 | Jongren et al. | ................ 370/252 |
| 2010/0322090 A1* | 12/2010 | Zhang et al. | ................... 370/252 |
| 2011/0105139 A1 | 5/2011 | On | |
| 2011/0250919 A1 | 10/2011 | Barbieri et al. | |
| 2012/0099455 A1* | 4/2012 | Morita et al. | ................. 370/252 |

(Continued)

FOREIGN PATENT DOCUMENTS

| | | |
|---|---|---|
| CA | 2832929 A1 | 7/2012 |
| CN | 101932100 A | 12/2010 |

OTHER PUBLICATIONS

DAC-UPC (Universitat Politecnica De Catalunya), "Proposal for DL interference coordination in Macro—ScHeNB scenario", 3GPP TSG-RAN WG3 # 74, R3-112752, p. 2, San Francisco, USA, Nov. 14-18, 2011.

(Continued)

*Primary Examiner* — Warner Wong

(57) ABSTRACT

A method for assessing the channel coefficients or the interference impact on a user equipment of a specific base station includes causing an interfering transmitter in the network to transmit data at substantially different power levels for each of at least two predefined frequency-resources each consisting of at least a part of a respective frequency channel, instructing the user equipment to measure and report to the serving base station at least one parameter associated with reception of the downlink signals that is indicative of channel coefficients or of an effect of the interfering signals and processing the results in order to assess the channel coefficients or the effect of the interfering signals.

25 Claims, 4 Drawing Sheets

(56) References Cited

U.S. PATENT DOCUMENTS

| | | | |
|---|---|---|---|
| 2013/0107798 A1* | 5/2013 | Gao et al. | 370/328 |
| 2013/0114438 A1* | 5/2013 | Bhattad et al. | 370/252 |
| 2014/0211690 A1* | 7/2014 | Nama et al. | 370/328 |
| 2014/0226539 A1* | 8/2014 | McCoy | 370/277 |
| 2014/0293822 A1* | 10/2014 | Fujishiro | 370/252 |

OTHER PUBLICATIONS

DAC-UPC (Universitat Politecnica De Catalunya), "Autonomous operational carrier selection: gain, X2 overhead and other aspects", 3GPP TSG-RAN WG3 # 75, R3-120087, p. 2, Dresden, Germany, Feb. 6-10, 2012.

3GPP TS 36.213, "3rd Generation Partnership Project; Technical Specification Group Radio Access Network; Evolved Universal Terrestrial Radio Access (E-UTRA); Physical layer procedures (Release 10)", V10.3.0, section 7.2.3, pp. 1-4, 62-64, Sep. 2011.

3GPP TS 36.423, "3rd Generation Partnership Project; Technical Specification Group Radio Access Network Evolved Universal Terrestrial Radio Access Network (E-UTRAN); X2 application protocol (X2AP) (Release 10)", V10.4.0, section 8.3.1, pp. 1-6, 18-19, Dec. 2011.

3GPP TS 36.214, "3rd Generation Partnership Project; Technical Specification Group Radio Access Network; Evolved Universal Terrestrial Radio Access (E-UTRA); Physical layer; Measurements (Release 10)", V10.1.0, section 5.1.12, pp. 1-3 & 10, Mar. 2011.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 10)", V10.3.0, section 6, pp. 1-12, 107-244, Sep. 2011.

IEEE Standard 802.16, "IEEE Standard for Air Interface for Broadband Wireless Access Systems", Revision of IEEE Standard 802.16-2009, chapter 15.3.5.2, pp. 2237-2239, Aug. 17, 2012.

3GPP TS 32.425, "3rd Generation Partnership Project; Technical Specification Group Services and System Aspects; Telecommunication management; Performance Management (PM); Performance measurements Evolved Universal Terrestrial Radio Access Network (E-UTRAN) (Release 10)", V10.5.0, section 4, pp. 1-6, 11-54, Jun. 2011.

Zulhasnine et al., "Efficient Resource Allocation for Device-to-Device Communication Underlaying LTE Network", 8 pages, Oct. 13, 2010.

Lindbom et al., "Enhanced Inter-cell Interference Coordination for Heterogeneous Networks in LTE-Advanced: A Survey", 18 pages, Dec. 7, 2011.

International Application # IB2014/061199 Search Report dated Aug. 3, 2014.

* cited by examiner

COLLABORATIVE MEASUREMENTS IN UN-SYNCHRONIZED WIRELESS NETWORKS

CROSS-REFERENCE TO RELATED APPLICATIONS

This application is a continuation of U.S. patent application Ser. No. 13/785,195, filed Mar. 5, 2013, which claims priority from Israeli patent application No. 218,527 titled "Collaborative measurements in cellular networks" filed on Mar. 7, 2012, which is incorporated herein by reference in its entirety.

FIELD OF THE INVENTION

The invention relates generally to digital communication systems and in particular to methods, apparatus and management entities to be used in cellular networks for the assessment of the interference impact of a specific transmitter.

BACKGROUND OF THE INVENTION

In some applications of the SON (self-optimizing networks) approach, knowledge of the interference effect of a specific base station (BS) on a UE (user equipment) is needed.

For example, modern pricing algorithms used in wireless cellular systems give significant improvements in network capacity as compared with selfish approaches, by taking into account the interference due to a specific BS. Such algorithms are described in the 3GPP DAC-UPC contributions R3-112752 and R3-120087.

Implementation of such algorithms or other SON applications generally requires the UE (user equipment) to measure the degradation of the usable MCS (modulation and coding scheme) caused by each strong interferer. This degradation is referred to as the "cost." However, no such measurements are defined in some cellular standards, such as LTE.

SUMMARY

Some embodiments of the present invention provide a method for determining the influence of a specific base station on interference related radio parameters of another base station.

According to a first embodiment of the present invention, is defined a method for assessing interference in a wireless network, comprising:

causing an interfering transmitter in the network to transmit data in accordance with at least one predefined time-frequency-pattern, which specifies a first set of time-frequency resources in which the interfering transmitter is to transmit first interfering signals at a first interfering power level and a second set of time-frequency resources in which the interfering transmitter is to transmit second interfering signals at a second interfering power level, lower from the first interfering power level, while a serving transmitter transmits downlink signals to user equipment;

instructing the user equipment to measure and report at least one parameter associated with reception of the downlink signals that is indicative of an effect of the interfering signals on the reception while the interfering transmitter operates in accordance with the predefined time-frequency pattern; and receiving and processing measurement results reported by the user equipment in order to assess the effect of the interfering signals.

According to another embodiment, the method comprises optimizing transmission of the downlink signals responsively to the effect of the interfering signals.

According to yet another embodiment, the serving transmitter belongs to a serving base station in the network.

According to another embodiment, the interfering transmitter belongs to one of a plurality of interfering base stations in the network.

According to another embodiment, the serving base stations and the interfering base stations operate in accordance with a standard of the Third-Generation Project Partnership (3GPP).

According to another embodiment, the predefined time-frequency pattern extends over multiple transmission frames, each frame containing multiple subframes at respective positions within the frame.

According to another embodiment, the multiple transmission frames comprise at least first and second frames, and wherein the subframes that are allocated to the first and second sets alternate between the first and second frames.

According to still another embodiment, the serving transmitter transmits the downlink signals at a constant power level within both the first and the second set of time-frequency resources.

According to yet another embodiment, the interfering transmitter transmits the downlink signals at a constant downlink power level within both the first and the second set of time-frequency resources.

According to another embodiment, processing the measurement results comprises comparing the at least one parameter reported by the user equipment with respect to the first set of the time-frequency resources to the at least one parameter reported by the user equipment with respect to the second set of the time-frequency resources.

According to another embodiment, the first and second sets of time-frequency resources have fixed, respective first and second positions relative to a start of frame over multiple transmission frames.

According to still another embodiment, the second interfering signals comprise only Almost Blank Subframes or zero-power transmission.

According to yet another embodiment, the serving base station is requested by a management entity to transmit the downlink signals over a specified set of time-frequency resources at specific power levels during a measurement interval.

According to still another embodiment, causing the interfering transmitter to transmit comprises sending a message from the serving base station to one of the interfering base stations to transmit the data in accordance with the at least one predefined time-frequency pattern.

According to an embodiment, the time-frequency pattern is allocated over a full frequency channel or over one or more physical resource blocks.

According to another embodiment the time-frequency pattern takes into account a lack of perfect synchronization between the serving transmitter and the interfering transmitter.

According to yet another embodiment, there is a wireless base station, comprising:

a radio interface, configured for communicating over a wireless network with user equipment;

a communication interface, configured for exchange of messages with other base stations in the wireless network; and a processor, which is configured to assess the interference impact of an interfering base station in the network operating in accordance with a predefined time-frequency pattern, which specifies a first set of time-frequency resources in which the interfering base station is to transmit first interfering signals at a first interfering power level and a second set of time-frequency resources in which the interfering base station is to transmit second interfering signals at a second interfering power level, lower than the first interfering power level, while the wireless base station transmits downlink signals via the radio interface to user equipment, wherein in the processor is also configured to instruct the user equipment, via the radio interface, to measure and report at least one parameter associated with reception of the downlink signals that is indicative of an effect of the interfering signals on the reception while the interfering transmitter operates in accordance with the predefined time-frequency pattern, and is configured to receive and process measurement results reported by the user equipment in order to assess the effect of the interfering signals.

According to another embodiment, the wireless base station is operational to transmit, via the network interface or via the radio interface, the assessment of the effect of the interfering signals, to the base station the interfering transmitter belongs to or to a wireless network management entity.

BRIEF DESCRIPTION OF THE DRAWINGS

The drawings do not represent an exhaustive representation of the possible embodiments of the invention and the invention is not limited to the arrangements presented in the drawings.

The drawings are.

DETAILED DESCRIPTION OF PREFERRED EMBODIMENTS

Embodiments of the invention are described hereinafter in conjunction with the figures.

The following description uses terminology familiar to those skilled in wireless networks and in particular in LTE technology. This should not be considered as a limitation for the applicability of the invention to other cellular technologies.

Overview

While the RSRP (reference signal received power) can determine the cumulative received signal from an eNB (base station in LTE) and the other cells using the reference signals, and RSRQ (reference signal received quality) can give an indication of the interference experienced by some cell-specific resource elements, these metrics cannot provide the needed information for pricing-based algorithms, being in fact useful only for greedy approaches of optimization. In effect, even the simple measurement of the contribution to the interference power of a specific BS cannot be evaluated by the UE with existing methods.

Embodiments of the present invention provide alternative approaches, still using the existing measurements which can be done by an UE, for determining physical layer parameters influenced by the interference caused by a specific transmitter, or for measuring the channel coefficients between an interfering base station and a victim UE.

Some embodiments provide a base station able to change the pattern of its transmissions based on requests from other base stations, so as to make possible the determination of the influence of its interference to interference-related parameters as measured by user equipment.

Deployment

Figure 1:
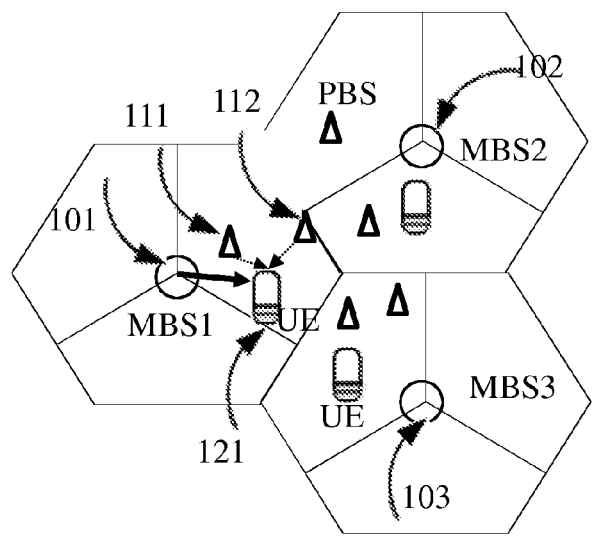
FIG. 1—Represents a number of heterogeneous base stations in a snap-shot of a cellular deployment.

The main application of pricing algorithms is in heterogeneous networks, using different transmit powers and antenna characteristics. An example of such deployment is shown in FIG. 1, where a macro base station MBS1-101 serving the UE-121 is interfered by two small base stations, for example a pico BS-111 and a HBS-112 (home base station). The small base stations 111 and 112 are interfering with the downlink (DL) transmissions of the base station 101. It is assumed that between the macro base stations are applied inter-cell interference coordination mechanisms based on the LOAD INDICATION message defined in the 3GPP TS 36.423v10.4.0 (Release 10), to be transmitted over the X2 interface, such that the other macro base stations 102 and 103 do not interfere with the downlink transmissions of the macro base station 101.

Physical Indicators

LTE defines reference signals which are transmitted by the eNB and may be measured by the UE, the resulting physical indicators being reported back to the eNB. There is a variety of transmission modes and measurement configurations. For example, CS-RS (cell specific reference signals) are continuously transmitted and their power or relative power can be measured by an UE and reported respectively as RSRP or RSRQ. Other reference signals are the CSI-RS (Channel state information RS), which can be transmitted with full power or with zero power.

However most of the interference to the data received by an UE is caused by the data transmission by other cells, transmissions which may take place with different power levels (including zero power) during different subframes and/or resource blocks. This interference is best reflected in the modulation and coding state (CMS) which could be used by the eNB when transmitting data, such to make possible the data demodulation at the UE with a given maximum error. In LTE the CMS is actually named CQI (channel quality indicator).

The CQI determination algorithm to be implemented by the UE is not defined in the existing LTE standards, being subject to proprietary implementations. It can be based on the SINR (signal to interference and noise ratio) of the received signal, for the target error probability of the received packets, and may or not consider the information acquired based on the CS-RS, CSI-RS and/or on the DM-RS (demodulation reference signals).

Note that the CQI determination is achieved by evaluating the errors in the reception of the data transmitted over PDSHC, as defined in 3GPP 36.213: "Based on an unrestricted observation interval in time and frequency, the UE shall derive for each CQI value reported in uplink subframe n the highest CQI index between 1 and 15 in Table 7.2.3-1 which satisfies the following condition, or CQI index 0 if CQI index 1 does not satisfy the condition:

A single PDSCH transport block with a combination of modulation scheme and transport block size corresponding to the CQI index, and occupying a group of downlink physical resource blocks termed the CSI reference resource, could be received with a transport block error probability not exceeding 0.1."

Also note that 3GPP 36.213 defines a number of measurement methods, which may be applied as a function of the subframe type and MIMO usage mode.

Some of the UE reports are transmitted through the base station to the management entity, known as OAM (Operations, Administration, Management); for LTE the corresponding performance measurement messages are defined in 3GPP TS 36.425. In addition to the reports defined in this standard, the proprietary OAM and base station implementations may include the transmission of significantly more reports.

General Principles—DL

Based on this invention, the effects of interference created by an aggressor BS to an UE served by a victim BS can be measured by the UE in multiple ways. We exemplify with the following cases, which require collaboration between base stations:

DL Case 1—Two Measurements

The interference caused by a specific base station (aggressor BS) to a victim UE associated with a victim base station can be evaluated based on two collaborative measurements, involving the measurement coordination for at least two BSs, as described below. During these two measurements, the coordination result is that the pattern of transmissions from other interfering base stations should remain unchanged and consistent with each of the following steps:

Step A

In one measurement (the order is not important), the UE performs a first determination of an interference-related physical parameter, while the aggressor BS transmits information and/or non-colliding reference signals at relatively high power. The above configuration is named "configuration A". The UE determines the achievable CMS or the received power level over the measurement resource, defined in time and frequency. Other relevant parameters may be the MIMO achievable rank and other parameters related to MIMO capabilities.

The resulting SINR in this measurement may be noted as $sinr\_1$. In the existing LTE standards (Release 10) the SINR is not reported by the UE to the eNB. The power level RSRP of the interfering eNB can be measured over the cell-specific reference signals (CS-RS or CRS in LTE) and will be registered as $rsrp\_1$. The power level over the entire channel (RSSI=received signal strength indicator) will be noted as $rssi\_1$.

The time resource for one measurement may be one or more subframes.

The frequency resource may cover a part of a channel (a number of resource groups or bandwidth parts or subbands in LTE), a full channel or a number of aggregated channels (if UE supports carrier aggregation). During this measurement all the interfering eNBs shall be active and transmit data using their regular power and MIMO configuration. The CQI is measured and reported by the UE to the serving BS usually per subframe. The resulting CQI index will be noted as $cqi\_1$.

Another measurement type performed in STEP A may be the measurement of the power level (for example, RSSI—receive strength signal indication) of the aggressor eNB; the aggressor BS, after activating a cell, contributes to interference and thus changes the RSSI level. The serving BS may reduce the power of its own transmission, by inserting ABS (Almost Blank Subframe) or MBSFN (multi-media single frequency network subframe) subframes with no data transmitted or blank subframes (nothing transmitted) during the allocated measurement time in STEP A or refrain from transmitting data during the allocated time and frequency resource. The Almost Blank Subframes are considered low-power transmission subframes. An aggressor BS which does not have enough information to transmit during the high-power subframes will be assessed as having lower influence on the interference-related parameters. The actual interference influence will be implicitly dependent on the load or spare capacity of the aggressor BS. For avoiding such a dependence, the aggressor BS should transmit during STEP A any data, even dummy data (not decodable by the served UEs).

STEP A may be programmed to be executed in a specific subframe or in multiple subframes. In case of multiple subframes, because based on existing procedures the UE reports the results per subframe, the serving BS or the management entity (OAM) should compute the average or other mathematical function of these measurements.

Figure 2:
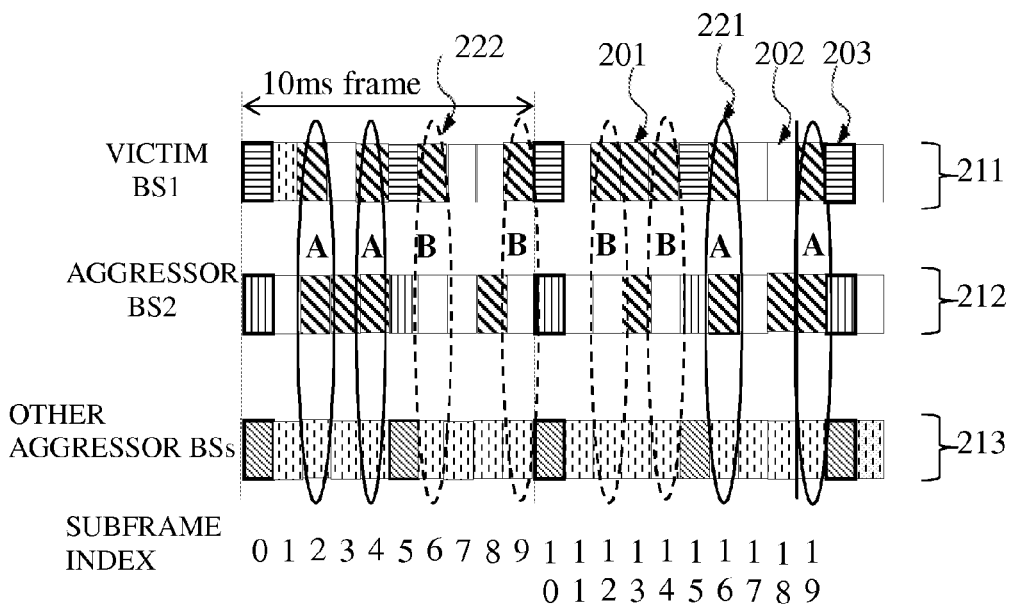
FIG. 2—Represents a possible subframe arrangement for the measurements of CQI degradation.

A possible set-up for measurements to be executed in the STEP A in multiple subframes is presented in FIG. 2, assuming synchronization between the victim and aggressor base stations. This figure presents the synchronized transmissions taking place in two consecutive DL frames, comprising the subframes 0 . . . 19 of an FDD (frequency division duplex) system. The victim BS1 transmits to its served UEs the sequence of subframes 211, while the aggressor BS transmits the sequence of subframes 212. The inter-cell coordination is such that victim eNB, instead of avoiding the interference, intentionally wants to experience it. The other interfering BSs (aggressors) may work in their regular mode and transmit the sequence of subframes 213.

The sequences of subframes 211 includes:
Subframes including synchronization and control information—203, as subframes 0, 5, 10, 15;
Subframes in which the transmission is done at relatively high power—201, as in subframes 2, 4, 6, 9, 12, 13, 14, 16 and 19;
Subframes in which the power is not defined, such as subframe 1
Subframes in which no data transmission takes place, i.e. the transmission is done at zero power—202, such as subframes 3, 7, 8, 11, 17, 18.

For the measurements to be made in STEP A is selected a subset of the subframes transmitted by the victim and aggressor base stations, such that the victim base station is transmitting at relatively high power and the aggressor is also transmitting at relatively high power. The selected subframes are marked with A-221 and in this example include the subframes 2, 4, 16, 19.

FIG. 2 illustrates the possibility of configuring measurements in different frames, for the case in which there is one dominant interferer, BS2. The arrangement in this figure enables a UE served by BS1 and interfered by BS2 to determine the average CQI, affected by the interference caused by BS2. The operation of other BSs is also considered. It is assumed that in normal operation the accumulated interference generated by these BSs is different in every subframe, but is stationary in the same subframe over multiple frames. In order to reduce the influence of this interference to the CQI measurement, the ABS and high-power transmission are defined in such a way that in different frames the same subframe (same position from the start of the frame) may be used alternately for ABS or for high power transmission of the aggressor BS, respectively referred to as configuration B-222 (to be used in STEP C) or A-221 (to be used in STEP A). So the BS2 influence is measured as an average over the frames included in the reporting interval.

Step B

In this step the UE sends the evaluation result to the serving BS or to the management entity. If multiple measurements are done, the reports for each measurement resource may be sent together or may be processed by the UE (for example, computing the average) and the final result may be sent in a single transmission.

Step C

Perform a second determination of a physical parameter of the victim base station which may be affected by interference. During this determination the aggressor eNB should not transmit or transmit zero power data and/or zero power reference signals.

Taking the CQI determination as a first example, data being transmitted during an equivalent CSI reference resource of the victim eNB, the interference caused by the aggressor eNB should be partially or totally eliminated. This can be achieved by configuring the subframe including the CSI reference resource on the aggressor eNB either as MBSFN (multimedia single frequency network subframe) with no data transmitted or as ABS (Almost Blank Subframe). In ABS only the reference signals and some control signals are transmitted. These signals do not have a significant influence on the performance of data reception by UEs served by other base stations. The above described configuration is named "configuration B". The SINR in the case of the second measurement may be registered as $sinr\_2$. Using LTE terminology, the obtained CQI is registered as $cqi\_2$.

In this example the victim eNB behavior is such to avoid the interference created by the aggressor eNB. A similar behavior takes place in inter-cell interference coordination (ICIC or eICIC).

A second example refers to the measurement of the interference power created by a specific base station. If in the STEP A the serving eNB has taken measures for reducing the power created by itself, the same approach should be used also during this measurement, because the scope of STEPs A and C is to determine only the influence of the aggressor BS on the interference-related parameters. In practice, if the difference in the received power as sensed by the UE is to be measured, ABS subframes may also be used by the serving BS during this step.

In STEP A the created configuration in both eNBs is different from the configuration used in eICIC (enhanced ICIC, introduced in LTE Rel.10), where the interference between BSs is reduced by inserting ABS in the aggressor BS, while the victim BS transmits with high power towards the UEs located at the cell margin.

In STEP C another configuration may be needed when measuring RSSI, in which ABS is inserted in both BSs in the same time.

The same reference resource that is used in STEP A may advantageously also be used in STEP C. For achieving this, the type of the message sent over X2 interface should be different from the existing messages, whereby each eNB only informs other eNBs about its actions of transmitting high power during some time-frequency resources. The X2 interface defined in LTE directly connects the neighbor eNBs. The messages to be transmitted over the X2 interface are defined in 3GPP TS 36.423.

In this case, it may be necessary that the aggressor eNB be REQUESTED by the victim BS or by the management entity to reduce its transmission during the measurement resource and the measurement time and eventually to indicate to it what type of subframe should be used.

STEP C may be programmed to be executed in a specific subframe or in multiple subframes. In case of multiple subframes, based on existing procedures, the UE reports the results per frame, and the serving BS or the management entity should compute the average or other mathematical function of these measurements.

An example of such measurement setup is shown in FIG. 2, assuming synchronization between victim and aggressor base stations, for the arrangement marked as B-222, taking place during the subframes 6, 9, 12 and 14. In this arrangement the victim BS transmits data with relatively high power, while the aggressor BS transmits zero power data or no data in ABS/MBSFN with no data/blank subframes.

Step D

In this step the UE sends the evaluation result to the serving BS or to the management system similarly to STEP B.

The serving BS may also forward the measurement result to other base stations, including the aggressor base station.

Step E

The serving BS or the management entity determines the influence of the aggressor BS on the physical indicator, for example the achievable CQI by the victim UE, by using the results obtained in both measurements. For example, the implemented algorithm may include subtraction of the received values, possibly in combination with other computations, depending of the used algorithm:

Subtracting the CQI indexes $cqi\_2-cqi\_1$
Subtracting the SNR values $sinr\_2-sinr\_1$
Subtracting the RSRP values $rsrp\_2-rsrp\_1$
Subtracting the RSSI values $rssi\_1-rssi\_2$.

Step F

The victim BS can send the evaluation results to the aggressor BS or may ask the aggressor BS to reduce the interference, for example by reducing the power of its transmissions, changing the beamforming direction or totally stopping operation. The resulting data may be also used in cost-based operational frequency selection.

Figure 6:
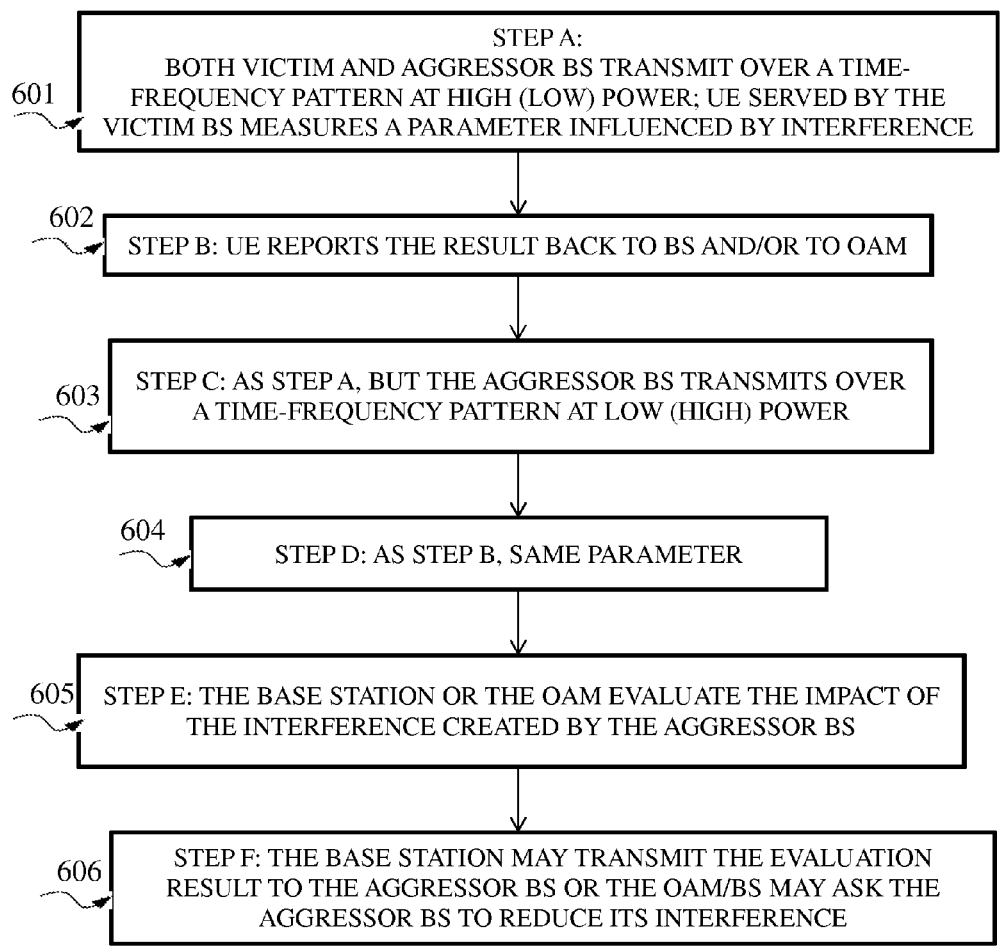
FIG. 6—Describes the steps of the measurement and interference assessment process FIG. 7—Represents the relevant blocks of a base station.

A summary of the measurement process explained above is presented in FIG. 6. In STEP A-601 and STEP C-603, both the serving base station and the aggressor base station transmit within the allocated time-frequency pattern, while using different power levels in each step (low and high, the order being not important). An UE served by the victim base station measures a parameter affected by interference. The time-frequency patterns may be different between these steps. In STEPs B-602 and D-604 the UE served by the victim base station reports the measurement results of the interference-related parameter to the serving base station or to the OAM. In STEP E-605 the serving base station or the OAM evaluate the impact of the interference created by the aggressor eNB. In STEP F-606 the serving base station or the OAM can either transmit the measurement result to the aggressor base station, supposed to take corrective actions, or can request the aggressor base station to take specific corrective actions, as reducing the power of its transmissions or change the operational frequency or switch off the operational frequency.

DL Case 2: One Measurement

Figure 3:
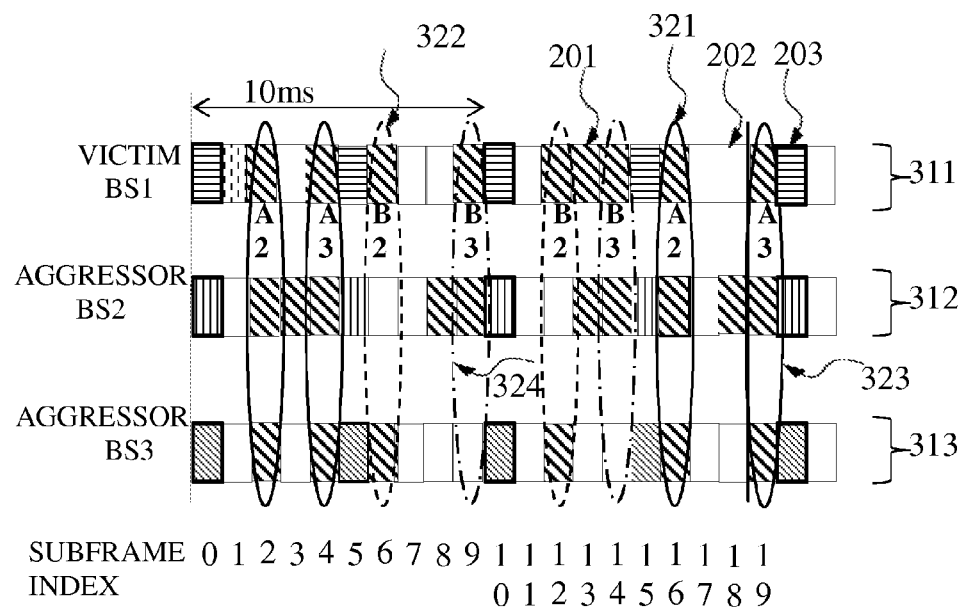
FIG. 3—Represents another subframe arrangement for the measurements of CQI degradation, in the case that there are two dominant interfering base stations.

A single measurement can serve as a replacement for the two-measurement case described above if the aggressor subframes are defined using a permutation, as for the examples defined in FIG. 2 or FIG. 3. These figures define alternating high-power and ABS subframes, which occur in the same subframe but different frames, for transmission by the aggressor BS.

In order to assess the impact of a base station in a single measurement is needed that the other interferers will have a minor influence. In the example from FIG. 2 the measurement of the physical indicator is done over the both arrangements A-221 and B-221. If the background interference from other base stations is low, the result will show half of the interference influence of the aggressor, given the alternating subframes of high power and zero power for this aggressor.

In FIG. 3, considering the case of two predominant aggressors, are shown the suitable sequences of subframes for the victim BS1 (311), the aggressor BS2 (312) and the aggressor BS3 (313). The other aggressors have a negligible influence. It is possible to obtain the influence of both aggressors from only two measurements and the suitable mathematic processing, as follows:

The first measurement is taken over the subframe arrangements A2(321) and B2(322); the result will depend of the influence of the aggressor BS3 and half of the influence of the aggressor BS2, due to the fact that the subframes transmitted by this aggressor are alternating high power and zero power.

The second measurement is taken over the subframe arrangements A3(323) and B3(324); the result will depend of the influence of the aggressor BS2 and half of the influence of the aggressor BS3, due to the fact that the subframes transmitted by this aggressor are alternating high power and zero power.

By the suitable processing of two equations with two unknown variables is possible to determine the influence of each aggressor.

Similarly to Case 1, the pattern and powers of transmissions from the victim and the main interfering base stations should remain unchanged during the measurement.

Synchronization Aspects

For implementing the described or similar measurements, inter-BS collaboration is needed for establishing the time-frequency resource for making the measurements. Some possible scenarios are described below.

Scenario A—Perfect Synchronization Implemented

In this scenario, the victim and aggressor base stations are synchronized. The main object of the collaboration is to establish the high power subframes and the ABS/MBSFN with no data/blank pattern to be used for measurement. Within these subframes specific physical resource blocks (in frequency domain) may or may not be used for taking the measurements. Obviously also the full frequency channel width can be used for measurement.

Scenario B: Imperfect Synchronization Between Base-Stations

The case of imperfect synchronization may appear when the synchronization is done over an IP or LAN connection. In this case, there may be a time lag of a non-integer number of subframes.

When the time difference is smaller than a subframe, this time difference is measured by the UE and reported to the serving eNB. The existing measurements defined in 3GPP 36.214 to be reported by the UE, using for example the messages and IE (information elements) defined in 3GPP 36.331, include the RSTD (reference signal time difference), by which the UE reports to the serving eNB (BS in LTE) the relative timing difference between the neighbor cell j and the reference cell i, between the start of one subframe from cell i that is closest in time to the subframe received from cell j.

In such a case, a subframe of the serving BS will be interfered with by transmissions belonging to two adjacent subframes of the aggressor BS. The subframe sequence in FIG. 4 for the victim BS1 is 411, while the subframe arrangement for the aggressor BS2 is 412.

Figure 4:
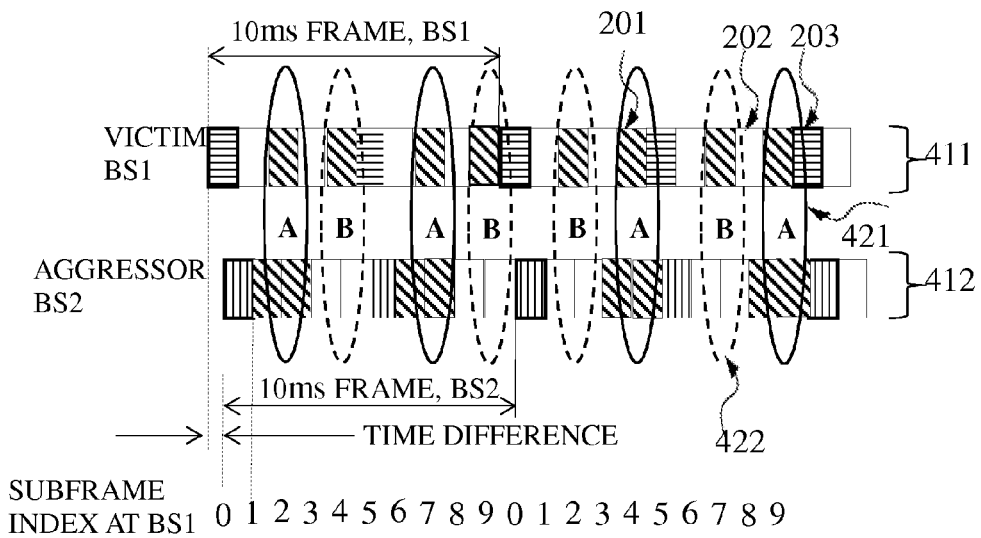
FIG. 4—Represents a subframe allocation in case of frame start delay.

The appropriate arrangement is exemplified in FIG. 4, where for each one of the configurations A (421) and B (422), two adjacent subframes are configured by the aggressor BS, such that the aggressor BS will always create interference during the entire measurement subframe.

The principle of permutation of the subframe allocation from frame to frame is also maintained in this example.

A new measurement and reporting framework is needed for the case that the relative timing difference is higher than a subframe, including the number of full subframes that occur between the start of frames of the two base stations.

Scenario C: Total Lack of Time Synchronization

In this case the only possibility to assess the interference created by the aggressor BS is to use measurements over a number of physical resource blocks (PRB) in frequency domain, preferably avoiding the PRBs situated at the center of the frequency channel, where the MIB (master information block) is transmitted. The same PRBs should be used in the victim and aggressor base stations.

Figure 5:
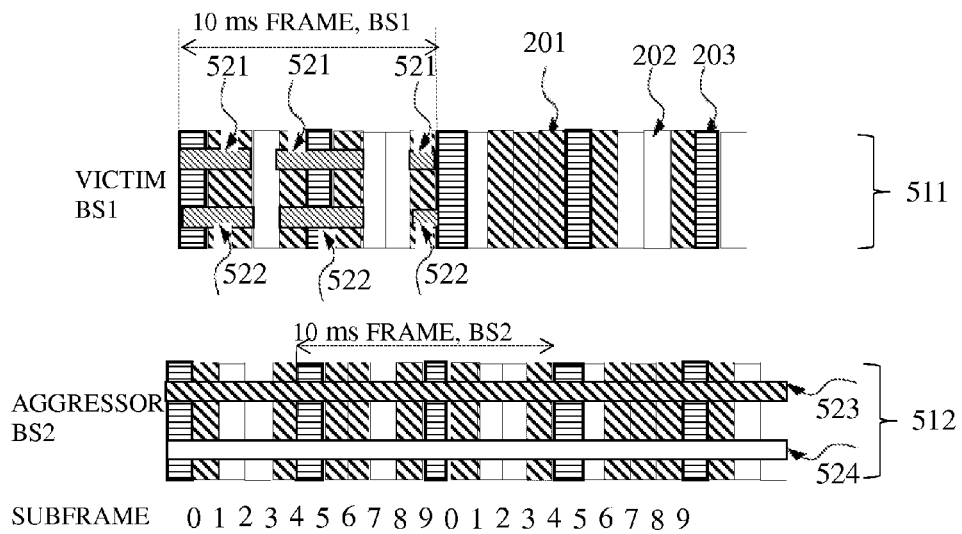
FIG. 5—Represents measurements using physical resource groups in addition to subframes.

The span in time of the measurement resources may be different in the victim and the aggressor base stations, as in the last one it should cover entire frames, such to be sure that is overlapping with the measurement subframes. The physical frequency resource may be the same (preferably) or different in each subframe. An example is shown in FIG. 5. In this example, the subframe sequence is 511 for the victim base station and 512 for the aggressor base station. In the STEP A, the victim BS operates with high power in the subframes 0, 1, 2, 4, 5, 6, 9. The measurement resource 521 is defined in frequency domain and it can be limited to few or more subframes. The aggressor BS transmits high power data during the PRBs 523, the transmission being continuous over the entire measurement interval.

In STEP C, the victim BS operates with high power in the subframes 0, 1, 2, 4, 5, 6, 9. The measurement resource 522 is defined in frequency domain within those subframes transmitting with high power. The aggressor BS transmits zero power data (no data) during the PRBs 524, the transmission being continuous over the entire measurement interval.

In case that the two measurements are done one after the other, the frequency resource can occupy the entire frequency channel.

Coordination Management

In order to coordinate the transmissions of the aggressor base station, three approaches may be used: a centralized approach, a distributed approach and a combined approach.

In the centralized approach, a management entity (OAM) assigns the subframes and the physical resource groups to be used for measurements, the type of interference avoidance (ABS or MBSFN with no data or blank subframes), and eventually the transmitted power of the aggressor BS. Typically the optimization algorithm will also reside in the management entity, such that the measurement results will be conveyed to this entity.

In the distributed approach the configuration of the time-frequency resources to be used is established using the connectivity between base stations and an appropriate protocol, such as X2AP described in 3GPP 36.423.

X2AP allows the sharing of ABS pattern information, by the use of the ABS Pattern Info IE (information element). However, the operational distribution of ABS patterns, used for eICIC (interference coordination in Rel.10), may not be compliant with the target set-up for the steps or configurations A and B, as defined above. In such a case, the BS or the management entity that is to perform the aggressor interference evaluation (may be either BS), may REQUEST another BS to configure a different ABS pattern, at least for the measurement duration. If the other BS acknowledges the application of the new pattern starting from a given time, the measurement can take place.

The starting measurement time can be defined as absolute time or as system frame number (SFN). The measurement ending time should be also established. To use a restricted frequency resource block, a new information element has to be added, indicating either the list of resource blocks as a pattern, the indexes of the first and last resource blocks, the indexes of the frequency channels to be used, or a combination of these elements that define the measurement frequency resource.

Another possibility is to identify the frequency resource with the resolution of subbands or bandwidth parts. The new information elements should be added to both the X2AP and Uu (UE-eNB) interfaces.

The interface with the management entity in the previous approach may use the same principles.

In the combined approach, both the management entity and the inter-base station communication protocol are involved. For example, if the management entity knows the number of strong interferers, it can define the ABS pattern a priori. The X2AP protocol can manage the start and the end of the measurement.

DL Case 3: Channel Coefficient Measurement

The discussion below applies to measurements of channel coefficients in case that the victim and the aggressor base stations are not synchronized or the synchronization is not tight enough.

The measurement should be done by the UE, for each aggressor BS antenna port and UE antenna port, during time-frequency intervals established by the serving (victim) BS. This BS should send the information regarding the time-frequency resource to be used for measurements to the other interfering BSs, which may also insert either high power data or ABS/MBSFN with no data subframes or not transmit data and/or not transmit reference signals during the frequency resource and subframes used for measurement.

A new message should be defined, requesting steady antenna configuration by the aggressor BSs and also requesting the aggressor BS to operate such to produce high or reduced interference during the intended measurements. The message should include the center frequency of the aggressor frequency channel to be measured, the Cell-ID and the time and frequency identification of the measuring interval. Based on the UE RSTD reports mentioned above, the time identification can be relatively precise for each destination BS. The preferred approach is that the aggressor BS should respond with a message indicating the transmission power, and possibly with a resource group or resource block or bandwidth part or subband resolution, and the number of used antennas during the measurement. Another possibility that the aggressor BS will send a Load Information message, with the Relative Narrowband Tx Power (RNTP) IE, which indicates, per PRB (physical resource block), whether downlink transmission power is lower than the value indicated by the RNTP Threshold IE.

Measurement Overhead

The fact that a BS will insert MBSFN with no data or ABS or blank subframes during a measurement can be perceived as a measurement overhead. To reduce the measurement overhead, non-colliding reference signals should be defined. The new messages to be defined should include the time-frequency position of these non-colliding reference signals and the parameters used for their modulation or scrambling. Such messages should be exchanged between the involved BSs or between a management entity and the involved BSs.

General Principles—UL

In case of uplink (UL) transmissions the UE can be an aggressor. Based on the scheduling information for a specific UE transmission, transmitted in advance by a serving eNB to the potential victim eNBs, the victim eNBs can assess the amount of interference and the channel coefficients. The measurement may be protected if other BSs avoid using the same frequency resource for scheduling served UEs. So the victim BS can request the other BSs to enforce the protection of a given time-frequency resource by not scheduling UL transmissions during that time-frequency resource.

Intra-Frequency and Inter-Frequency

Intra-frequency operation of a base station takes place for the frequency channel (single carrier) or the aggregated frequency channels (multi-carrier) served by a BS. Operation outside these channels is named inter-frequency.

The level of interference caused by another base station in other frequencies can be relevant for operational or additional carrier selection. The measurements are done always by a UE, such that the downlink (DL) coordination procedures for creating protected resources, as explained above, are still relevant.

Multiple BSs

The measurements of the CQI, RSSI, etc., can be done for multiple aggressor BSs, while a subframe is dedicated only for the measurement of the influence of a specific BS, and the configurations A and B are alternated in the adjacent frames. The resource definition in time and frequency domains allows the multiplexing of the measurement resources, such that they will not overlap with each other.

In DL Case 3, when measuring the channel coefficients, it is preferable, in order to increase the accuracy of the measurements, that inter-BS interference during the measurements be avoided by asking the strong interfering BSs to use ABS or MBSFN with no data subframes, such that only one BS will transmit during a specific time-frequency resource.

TDD/FDD

The measurement procedures exemplified in this proposal can be applied equally in TDD or FDD systems.

Base Station Implementation

Figure 7:
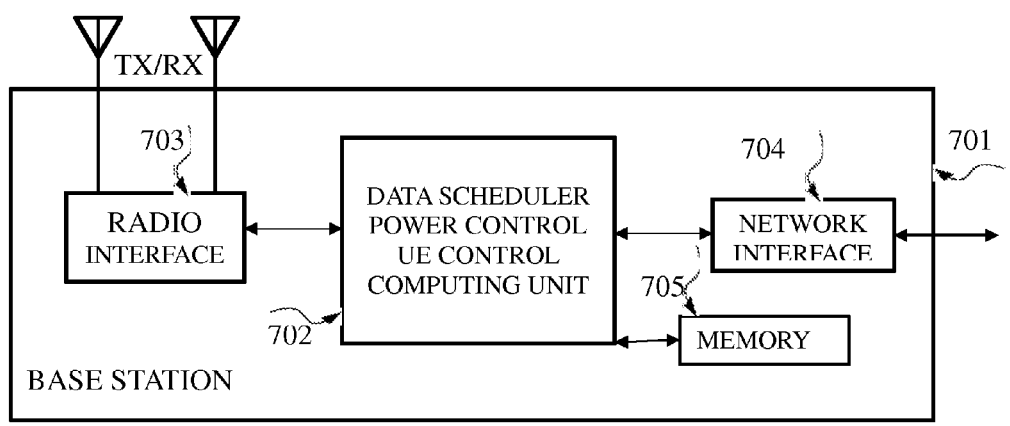

The base station blocks shown in FIG. 7 are only by way of examples; in practical implementations these blocks can be distributed on multiple circuit boards and the control functions and hardware functions can be implemented on commercial processors or tailor-made logical arrays, such as system-on-a-chip, FPGAs, ASICs.

The functional blocks of the base station-701 identified as relevant to this invention are the radio interface 703, providing the wireless communication with an UE, the network (communication) interface 704 enabling the message transmission over the network, towards another base station or to the OAM or to other entities in the Operator network. The controller 702 includes as a sub-set of its functions, some functions relevant to this invention, such as scheduling of the traffic, power control, UE control including the reporting activity and computing functions determining the interference impact of a specific base station. Additional control functions are used in the actions taken by the BS to improve its own wireless throughput as well as the wireless network throughput. The data used by the controller is stored in a memory function —705.

Technologies

The coordinated measurement approach can be applied for any technology using frames and scheduling. We have provided examples above using the LTE technology, which allows time/frequency partitioning (similar with IEEE 802.16), but the proposed measurement methods can be equally applied for CDMA technologies.

The description of the embodiments above refers to base stations, but other central or distributed wireless transmission entities, such as access points, Node B, etc., can also be operated in similar fashion.

As will be appreciated by those skilled in the art, the terminology used throughout the specification is mainly associated with the LTE standards. However, it should be understood that embodiments of the present invention encompass other cellular standards, such as 802.16, HSDPA or CDMA/EV-DO and the like and both TDD and FDD duplexing modes. Also, the examples provided show certain ways of carrying out the invention. It is to be understood that invention is not intended to be limited to the examples disclosed herein. Rather, the invention extends to all functionally equivalent structures, methods and uses, such as are within the scope of the hereinafter claims.

The invention claimed is:

1. A method for assessing interference in a wireless network, comprising:
   causing an interfering transmitter in the network to transmit data in accordance with at least one frequency pattern, which specifies a first set of frequency resources consisting of at least a first part of at least one first frequency channel in which the interfering transmitter is to transmit first interfering signals at a first interfering power level and a second set of frequency resources consisting of at least a second part of at least one second frequency channel in which the interfering transmitter is to transmit second interfering signals at a second interfering power level, lower than the first interfering power level, while a serving transmitter transmits downlink signals to user equipment;
   instructing the user equipment to measure and report at least one parameter associated with reception of the downlink signals that is indicative of an effect of the interfering signals on the reception while the interfering transmitter operates in accordance with the predefined frequency pattern; and
   receiving and processing measurement results reported by the user equipment in order to assess the effect of the interfering signals.

2. The method according to claim 1, wherein the method comprises optimizing transmission of the downlink signals responsively to the effect of the interfering signals.

3. The method according to claim 1, wherein the serving transmitter belongs to a serving base station in the network.

4. The method according to claim 3, wherein the interfering transmitter belongs to one of a plurality of interfering base stations in the network.

5. The method according to claim 3, wherein the serving base station operate in accordance with a standard of the Third-Generation Project Partnership (3 GPP).

6. The method according to claim 5, wherein the predefined frequency pattern extends over multiple transmission frames.

7. The method according to claim 1, wherein the first and second sets of the frequency resources occupy entire frequency channels.

8. The method according to claim 1, wherein the second frequency channel is identical with the first frequency channel.

9. The method according to claim 1, wherein the measurement results consist of at least one parameter from a list consisting of: RSSI, RSRP, RSRQ, CQI, CSI and SINR.

10. The method according to claim 1, wherein processing the measurement results include subtracting from the at least one parameter reported by the user equipment with respect to the first set of the frequency resources the at least one parameter reported by the user equipment with respect to the second set of the frequency resources.

11. The method according to claim 1, where the second interfering signals comprise only almost blank or zero-power transmission.

12. The method according to claim 3, where the serving base station is requested by a management entity to transmit downlink data over a specified set of frequency resources at specific power levels during a measurement interval.

13. The method according to claim 4, where causing the interfering transmitter to transmit comprises sending a message from the serving base station to one of the interfering base stations requesting to transmit the data in accordance with the at least one frequency pattern within at least one of the frequency channels, wherein the message includes an identifier of the at least one of the frequency channels, a base station identifier, and at least one parameter from a list consisting of: an identifier of a part within one of the frequency channels, the first interfering power level, and the second interfering power level.

14. The method according to claim 1, wherein the specified parts of the first and second frequency channels are subbands or physical resource blocks.

15. The method according to claim 1, where the measurement time takes into account a lack of perfect synchronization between the serving transmitter and the interfering transmitter.

16. A wireless base station, comprising:
    a radio interface, configured for communicating over a wireless network with user equipment;
    a communication interface, configured for exchange of messages with other base stations in the wireless network; and
    a processor, which is configured to assess the interference impact on a user equipment of an interfering base station operating in accordance with a predefined frequency pattern, which specifies a first set of frequency resources consisting of at least a first part of at least one first frequency channel in which the interfering base station is to transmit first interfering signals at a first interfering power level and a second set of frequency resources consisting of at least a second part of at least one second frequency channel in which the interfering base station is to transmit second interfering signals at a second interfering power level, lower than the first interfering power level, while the wireless base station transmits downlink signals as a serving base station via the radio interface to the user equipment,
    wherein in the processor is also configured to instruct the user equipment, via the radio interface, to measure and report at least one parameter associated with reception of the downlink signals that is indicative of an effect of the interfering signals on the reception while the interfering transmitter operates in accordance with the predefined frequency pattern, and is configured to receive and process measurement results reported by the user equipment in order to assess the effect of the interfering signals.

17. The wireless base station according to claim 16, wherein the processor is operational to transmit, via the communication interface or via the radio interface, a message to indicate an identifier of at least one frequency channel, a base station identifier, and at least one parameter from a list consisting of: a part within a frequency channel, the first transmission power level, and the second transmission power level.

18. The wireless base station according to claim 16, wherein the processor is operational to transmit, via the communication interface or via the radio interface, an assessment of the effect of the interfering signals to the interfering base station to or to a wireless network management entity.

19. The wireless base station according to claim 16, where the second frequency channel is identical with the first frequency channel.

20. A method for assessing channel coefficients in a wireless network, comprising:
    causing an interfering transmitter in the network to transmit data in accordance with at least one frequency pattern, which specifies a first set of frequency resources consisting of at least a first part of at least one frequency channel in which the interfering transmitter is to transmit first interfering signals at a first interfering power level and a second set of frequency resources consisting of at least a second part of at least one frequency channel in which the interfering transmitter is to transmit second interfering signals at a second interfering power level, lower than the first interfering power level, while a serving transmitter transmits downlink signals to user equipment;
    instructing the user equipment to measure and report at least one parameter associated with reception of the downlink signals that is indicative of an effect of the interfering signals on the reception while the interfering transmitter operates in accordance with the predefined frequency pattern; and
    receiving and processing measurement results reported by the user equipment in order to compute coefficients of the wireless channel between the user equipment and the interfering transmitter.

21. The method according to claim 20, wherein the computation of channel coefficients includes subtracting the measurement results.

22. The method according to claim 20, wherein the measurement results include at least one parameter from a list consisting of: RSSI and RSRP.

23. A wireless base station, comprising:
    a radio interface, configured for communicating over a wireless network with user equipment;
    a communication interface, configured for exchange of messages with other base stations in the wireless network; and
    a processor, which is configured to assess at least one coefficient of a wireless channel between user equipment and an interfering base station operating in accordance with a predefined frequency pattern, which specifies a first set of frequency resources consisting of at least a first part of at least one first frequency channel in which the interfering base station is to transmit first interfering signals at a first interfering power level and a second set of frequency resources consisting of at least a second part of at least one second frequency channel in which the interfering base station is to transmit second interfering signals at a second interfering power level, lower than the first interfering power level, while the wireless base station transmits downlink signals as a serving base station via the radio interface to the user equipment,
    wherein the processor is also configured to instruct the user equipment, via the radio interface, to measure and report at least one parameter associated with reception of the downlink signals that is indicative of an effect of the interfering signals on the reception while the interfering transmitter operates in accordance with the predefined frequency pattern, and is configured to receive and process measurement results reported by the user equipment in order to compute at least one coefficient of the wireless channel between the user equipment and the interfering base station.

24. The wireless base station according to claim 22, wherein the computation of the channel coefficients includes subtracting the measurement results.

25. The wireless base station according to claim 22, wherein the user equipment reports at least one parameter from a list consisting of: RSSI and RSRP.

* * * * *